United States Patent
Mikami et al.

(10) Patent No.: US 11,312,245 B2
(45) Date of Patent: Apr. 26, 2022

(54) VEHICLE POWER SUPPLY SYSTEM

(71) Applicant: TOYOTA JIDOSHA KABUSHIKI KAISHA, Toyota (JP)

(72) Inventors: Akira Mikami, Mishima (JP); Shota Fuchigami, Toki (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 0 days.

(21) Appl. No.: 17/188,208

(22) Filed: Mar. 1, 2021

(65) Prior Publication Data
US 2021/0276431 A1    Sep. 9, 2021

(30) Foreign Application Priority Data

Mar. 9, 2020 (JP) .............................. JP2020-040095

(51) Int. Cl.
| | |
|---|---|
| *H03H 7/01* | (2006.01) |
| *H02M 7/5395* | (2006.01) |
| *H02M 3/156* | (2006.01) |
| *B60L 50/60* | (2019.01) |
| *H02M 1/44* | (2007.01) |
| *H01F 27/24* | (2006.01) |

(52) U.S. Cl.
CPC .............. *B60L 50/60* (2019.02); *H02M 1/44* (2013.01); *H01F 27/24* (2013.01)

(58) Field of Classification Search
CPC ........... H02M 1/14; H02M 1/44; B60R 16/03; B60L 50/60; H01F 27/24
See application file for complete search history.

(56) References Cited

U.S. PATENT DOCUMENTS

| | | | | |
|---|---|---|---|---|
| 10,295,213 | B2* | 5/2019 | Makino | ................... F24F 11/62 |
| 11,088,614 | B2* | 8/2021 | Osako | ..................... H02M 1/12 |
| 2011/0103098 | A1* | 5/2011 | Wu | ......................... H02M 1/36 |
| | | | | 363/17 |
| 2013/0229156 | A1* | 9/2013 | Brandon | ............... B60L 3/0046 |
| | | | | 320/136 |
| 2020/0162051 | A1* | 5/2020 | Taniguchi | ............ H03H 7/0153 |
| 2021/0124078 | A1* | 4/2021 | Widmer | ............... G06K 9/6262 |
| 2021/0319956 | A1* | 10/2021 | Hou | ....................... H01G 4/228 |

FOREIGN PATENT DOCUMENTS

| | | |
|---|---|---|
| JP | 2006-332475 A | 12/2006 |
| JP | 2019-047541 A | 3/2019 |
| WO | 2015/104936 A1 | 7/2015 |

\* cited by examiner

*Primary Examiner* — Jared Fureman
*Assistant Examiner* — Esayas G Yeshaw
(74) *Attorney, Agent, or Firm* — Oliff PLC (57) ABSTRACT

A vehicle power supply system includes a power storage device, a plurality of devices including a plurality of noise generators, and a power distribution circuit connecting the power storage device and the devices. Each of the noise generators is connected to the power distribution circuit via a noise filter. The noise filter includes a first impedance element and a Y capacitor provided closer to the noise generators than the first impedance element. The first impedance element provided for each of the noise generators is an impedance element having a shape and a material that increase a first system impedance of each of the devices to be higher than a predetermined lower limit impedance at least in an amplitude modulation band.

8 Claims, 8 Drawing Sheets

VEHICLE POWER SUPPLY SYSTEM

CROSS-REFERENCE TO RELATED APPLICATION

This application claims priority to Japanese Patent Application No. 2020-040095 filed on Mar. 9, 2020, incorporated herein by reference in its entirety.

BACKGROUND

1. Technical Field

The present disclosure relates to a vehicle power supply system.

2. Description of Related Art

As a countermeasure against noise in a common mode, a technique is known that a noise filter in which a Y capacitor and an impedance element are combined is provided for a noise generator. Examples of the impedance element include ferrite cores and common mode choke coils. In an example disclosed in Japanese Unexamined Patent Application Publication No. 2019-047541 (JP 2019-047541 A), a noise filter is provided for each of a plurality of power conversion devices connected in parallel to a power supply. In each noise filter, a capacitance of the Y capacitor and an inductance value of the common mode choke coil are set such that the impedance of the noise filter is higher than the impedance of the noise filter on the power supply side predetermined in advance.

One of the issues in the vehicle power supply system is to reduce noise in an amplitude modulation (AM) band (0.1 to 2 MHz), so-called radio noise. The vehicle power supply system is composed of a plurality of devices including a device that is a noise generation source. The technique described in JP 2019-047541 A does not particularly take into account reduction of the noise in the AM band as the entire system consisting of the devices above.

SUMMARY

The present disclosure provides a vehicle power supply system capable of reducing noise in an AM band.

A vehicle power supply system according to an aspect of the present disclosure includes: a power storage device; a plurality of devices including a plurality of noise generators; and a power distribution circuit that connects the power storage device and the devices. Each of the noise generators is connected to the power distribution circuit via a noise filter. The noise filter includes a first impedance element and a Y capacitor that is provided closer to the noise generators than the first impedance element. The first impedance element provided for each of the noise generators is an impedance element with a shape and a material that increase a first system impedance of each of the devices to be higher than a predetermined lower limit impedance at least in an amplitude modulation band. The first system impedance is an impedance on a power distribution circuit side with respect to a connection portion of each of the devices with the power distribution circuit.

With the vehicle power supply system according to the aspect of the present disclosure, the shape and the material of each impedance element are adjusted such that the system impedance is higher than the predetermined lower limit impedance in each of the devices at least in the AM band. Therefore, the noise can be reduced in the AM band as the entire vehicle power supply system. In the vehicle power supply system according to the aspect of the present disclosure, the first impedance element may be an impedance element with a shape and a material that settle a variation of the first system impedance among the devices within a predetermined allowable range. With the vehicle power supply system according to the aspect of the present disclosure, entry of the noise into the device having lower system impedance than that of the other devices can be suppressed.

In the vehicle power supply system according to the aspect of the present disclosure, the power storage device may be connected to the power distribution circuit via a second impedance element. The second impedance element provided for the power storage device may be an impedance element with a shape and a material that increase the second system impedance to be higher than the predetermined lower limit impedance at least in the AM band in the power storage device. The second system impedance may be an impedance on a power distribution circuit side with respect to a connection portion of the power storage device with the power distribution circuit. With the vehicle power supply system according to the aspect of the present disclosure, the noise in the AM band can be reduced as the entire vehicle power supply system even when the power storage device is one of noise generation sources. In the vehicle power supply system according to the aspect of the present disclosure, the first impedance element and the second impedance element may be impedance elements with shapes and materials that settle a variation of the first system impedance and the second system impedance among the devices and the power storage device within a predetermined allowable range. With the vehicle power supply system according to the aspect of the present disclosure, entry of the noise into the device having lower system impedance than that of the other devices or the power storage device can be suppressed.

In the vehicle power supply system according to the aspect of the present disclosure, the predetermined lower limit impedance may be an impedance determined based on impedance-frequency characteristics of a line impedance stabilization network. In the vehicle power supply system according to the aspect of the present disclosure, the first impedance element and the second impedance element may be a ferrite core. In the vehicle power supply system according to the aspect of the present disclosure, at least one of the noise generators may be an inverter including a switching element. In the vehicle power supply system according to the aspect of the present disclosure, at least one of the devices may be a direct current-direct current (DC-DC) converter.

As described above, with the vehicle power supply system according to the aspect of the present disclosure, the noise in the AM band can be reduced as the entire vehicle power supply system.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

Embodiments of the present disclosure will be described below with reference to the drawings. However, in the following embodiments, when the number, a quantity, an amount, or a range of each element, for example, is mentioned, the present disclosure is not limited to the mentioned number, etc., unless otherwise specified or except for the case where the number is obviously limited to the number mentioned in the embodiments in principle. Further, configurations, etc. that will be described in the following embodiments are not necessarily essential to the present disclosure, unless otherwise specified or except for the case where configurations are obviously limited to the configurations mentioned in the embodiments in principle.

1. Configuration of Vehicle Power Supply System

Figure 1:
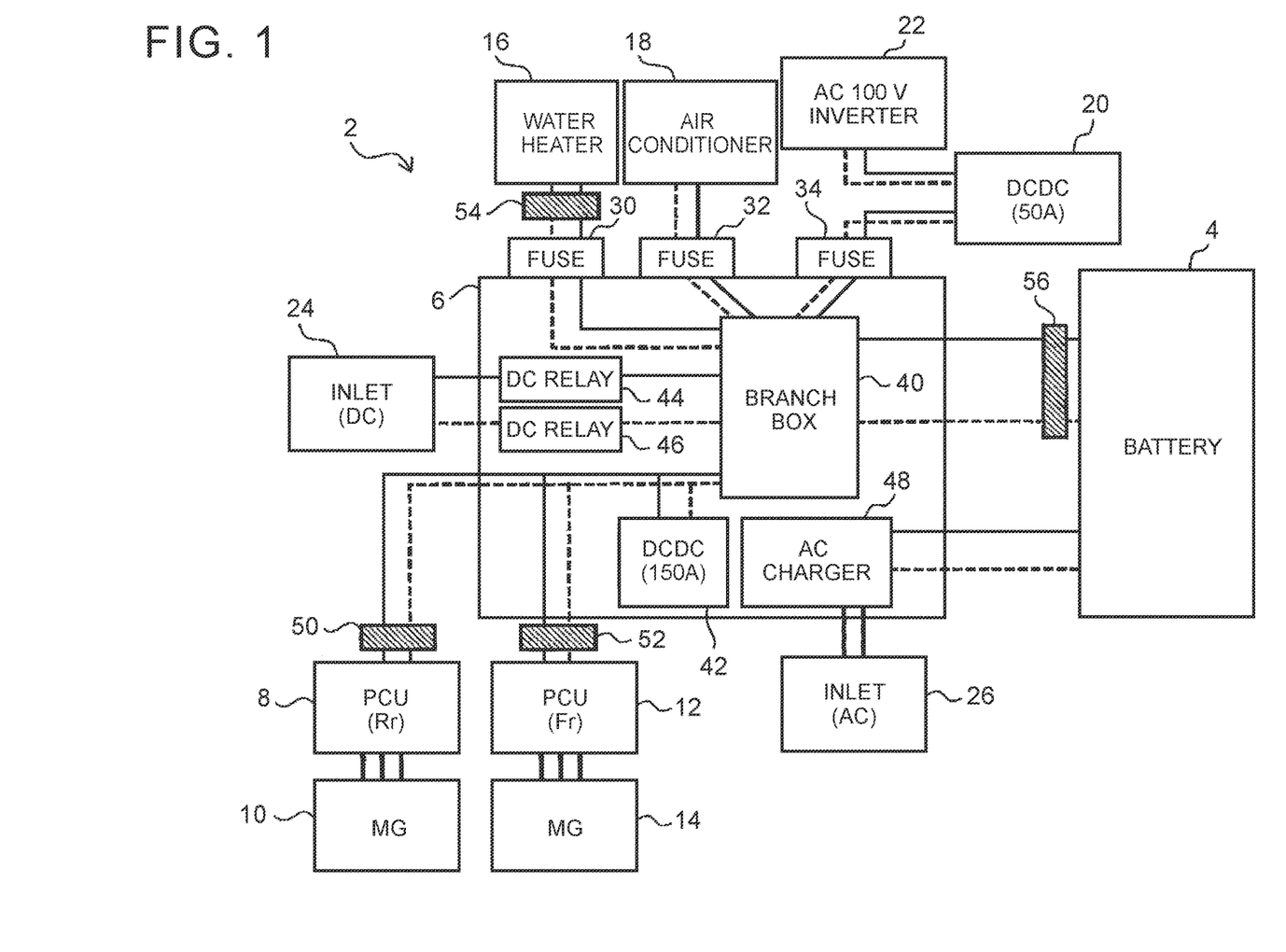
FIG. 1 is a diagram showing a configuration of a vehicle power supply system according to an embodiment of the present disclosure.

FIG. 1 shows a configuration of a vehicle power supply system according to an embodiment. A vehicle power supply system 2 according to the embodiment is a power supply system for an electric vehicle. However, the vehicle power supply system 2 may also be applied to a hybrid vehicle equipped with an engine, in addition to a pure electric vehicle not equipped with the engine.

The electric vehicle to which the vehicle power supply system 2 is applied includes a rear motor generator 10 for driving rear wheels and a front motor generator 14 for driving front wheels. Hereinafter, the motor generator is referred to as an MG. The MGs 10, 14 are, for example, three-phase alternate current (AC) synchronous motors. The MGs 10, 14 are supplied with electric power to generate a driving force. When the vehicle is braked, the MGs 10, 14 operate as generators to generate electricity. However, a motor and a generator may be provided separately. That is, the MG 10 may be a combination of a motor for driving the rear wheels and a generator for performing regenerative braking of the rear wheels. Similarly, the MG 14 may be a combination of a motor for driving the front wheels and a generator for performing regenerative braking of the front wheels.

The vehicle power supply system 2 includes a high-voltage battery 4 configured to be chargeable and dischargeable. The electric power for driving the MGs 10, 14 is supplied from the high-voltage battery 4. Further, the high-voltage battery 4 is charged with the electric power generated by the MGs 10, 14. The high-voltage battery 4 is a power storage device including a secondary battery such as a lithium ion battery or a nickel metal hydride battery. The lithium ion secondary battery may be a general lithium ion secondary battery having a liquid electrolyte, or an all-solid-state battery using a solid electrolyte. The high-voltage battery 4 may also be replaced with a power storage device including a power storage element such as a capacitor.

The vehicle power supply system 2 includes a power distribution unit 6 that supplies the electric power stored in the high-voltage battery 4 to a plurality of devices. The power distribution unit 6 includes a branch box 40 for connecting the devices to the high-voltage battery 4.

The branch box 40 is connected to the high-voltage battery 4 via a system main relay (not shown). The branch box 40 includes a first power control unit 8, a second power control unit 12, a water heater 16, an air conditioner 18, a first direct current-direct current (DC-DC) converter 42, a second DC-DC converter 20, and a DC power supply inlet 24 that are connected in parallel by a pair of power lines. The branch box 40 and the power lines connecting the branch box 40 and the devices constitute a power distribution circuit for connecting the devices and the high-voltage battery 4. Hereinafter, the power control unit will be referred to as a PCU.

The PCUs 8, 12 include a plurality of power cards stacked on each other with a cooler interposed therebetween. Each of the power cards includes a single package of an insulated gate bipolar transistor (IGBT) and a diode constituting the inverter. The PCU (rear PCU) 8 is provided between the high-voltage battery 4 and the MG (rear MG) 10. The PCU (front PCU) 12 is provided between the high-voltage battery 4 and the MG (front MG) 14. The PCUs 8, 12 control the driving force generated by the MGs 10, 14 by controlling the electric power supplied from the high-voltage battery 4. The electric power generated by the MGs 10, 14 is supplied to the high-voltage battery 4 via the PCUs 8, 12.

The water heater 16 is connected to the branch box 40 via a fuse 30. The water heater 16 operates with the electric power supplied from the high-voltage battery 4 to heat water to generate hot water. The hot water generated by the water heater 16 is used for, for example, heating a cabin of the vehicle in winter. The water heater 16 is, for example, a positive temperature coefficient (PTC) heater. Energization to the water heater is controlled using a pulse width modulation (PWM) method based on a control signal from an electronic control unit (ECU), which is not shown.

The air conditioner 18 is connected to the branch box 40 via a fuse 32. The air conditioner 18 includes an electric compressor (not shown). The compressor operates with the electric power supplied from the high-voltage battery 4. The air conditioner 18 adjusts the temperature inside the cabin of the vehicle based on a control signal from an ECU (not shown).

The first DC-DC converter 42 is built in the power distribution unit 6. The first DC-DC converter 42 is a large current output converter having a rated output current of, for example, 150 A. The first DC-DC converter 42 is connected to a low voltage battery (not shown) and is configured to step down the electric power received from the high-voltage battery 4 to a voltage level of the low-voltage battery.

The second DC-DC converter 20 is connected to the branch box 40 via a fuse 34. The rated output current of the second DC-DC converter 20 is, for example, 50 A. The second DC-DC converter 20 is connected to an alternate current (AC) 100 V inverter 22 and is configured to step down the electric power received from the high-voltage battery 4 to an input voltage level of the AC 100 V inverter 22.

The DC power supply inlet 24 is a power receiving unit to which a connector of a DC charging cable (not shown) is connected. The DC charging cable is connected to a DC power supply (not shown). The DC power supply inlet 24 is connected to the branch box 40 via DC relays 44, 46 built in the power distribution unit 6. The DC relays 44, 46 are turned on by an ECU (not shown) when external charging by the DC power supply is executed.

The power distribution unit 6 includes a built-in AC charger 48. An AC power supply inlet 26 installed outside the power distribution unit 6 is connected to the AC charger 48. The AC power supply inlet 26 is a power receiving unit to which a connector of an AC charging cable (not shown) is connected. The AC charging cable is connected to an AC power supply (not shown).

The AC charger 48 includes an AC-DC converter that converts AC power received from the AC power supply into DC, and a DC-DC converter that converts the output of the AC-DC converter to the voltage level of the high-voltage battery 4. The AC charger 48 is not connected to the branch box 40, and is directly connected to the high-voltage battery 4 via a charging relay (not shown). The charging relay is turned on by an ECU (not shown) when external charging by the AC power supply is executed.

In addition to the configuration above, the vehicle power supply system 2 includes impedance elements at key points. In the embodiment, ferrite cores 50, 52, 54, 56 are used as the impedance elements. However, common mode choke coils may be used instead of the ferrite cores. The ferrite core 50 is provided in the power line connecting the rear PCU 8 and the branch box 40. The ferrite core 52 is provided in the power line connecting the front PCU 12 and the branch box 40. The ferrite core 54 is provided in the power line connecting the water heater 16 and the branch box 40. In the embodiment, the ferrite cores 50, 52, 54 may be regarded as examples of a first impedance element. The ferrite core 56 is provided in the power line connecting the high-voltage battery 4 and the branch box 40. In the embodiment, the ferrite core 56 may be regarded as an example of a second impedance element.

The rear PCU 8, the front PCU 12, and the water heater 16 for which the ferrite cores 50, 52, and 54 are provided, respectively, are noise generators having a noise generation source inside. Further, the high-voltage battery 4 for which the ferrite core 56 is provided also has a noise generation source inside. The ferrite cores 50, 52, 54, 56 are provided for the purpose of reducing noise emitted from the vehicle power supply system 2 to the outside, particularly noise in the common mode, by increasing a system impedance that will be described later. The layout positions of the ferrite cores 50, 52, 54, 56 shown in FIG. 1 are examples. The ferrite cores 50, 52, 54, 56 may be disposed inside the devices, or may be disposed inside the power distribution unit 6.

2. Details of Noise Reduction Measures

Figure 2:
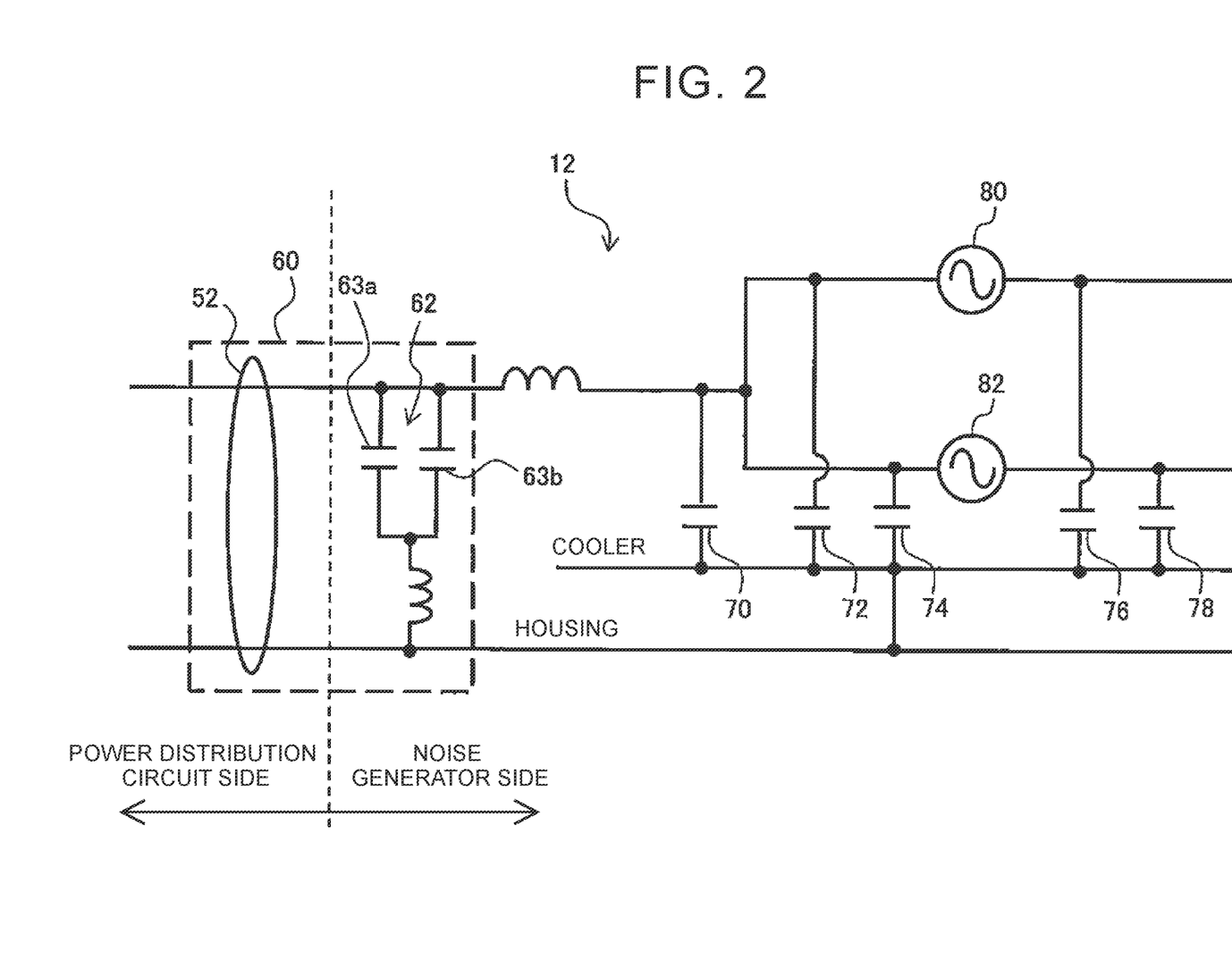
FIG. 2 is a circuit diagram showing an equivalent circuit of a power control unit (PCU)

Next, details of noise reduction measures adopted in the vehicle power supply system 2 will be described with reference to FIG. 2. FIG. 2 is a circuit diagram showing an equivalent circuit of the PCU. Here, the equivalent circuit of the front PCU 12 is taken as an example. However, the equivalent circuit of the rear PCU 8 can also be represented by the same circuit diagram. Further, the equivalent circuits of other noise generators can be represented by circuit diagrams similar to the above circuit.

The front PCU 12 includes a booster circuit (not shown) and inverters 80, 82. Each of the inverters 80, 82 is composed of a bridge circuit including three-phase switching elements. One inverter (the inverter 80) operates the MG 14 shown in FIG. 1 as a motor, and the other inverter (the inverter 82) operates the MG 14 as a generator. The noise is generated from the inverters 80, 82 as the switching elements operate. That is, the inverters 80, 82 are the noise generation sources.

The noise emitted from each noise generator of the vehicle power supply system 2 along the power line includes the noise in the common mode. In the vehicle power supply system 2, a noise filter for reducing the noise in the common mode is provided for each noise generator. The noise filter includes a Y capacitor provided on the power distribution circuit side and the ferrite core above provided on the power distribution circuit side. A noise filter 60 is also provided for the front PCU 12.

The noise filter 60 for the front PCU 12 includes a Y capacitor 62 and the ferrite core 52. The Y capacitor 62 is provided on the inverters 80, 82 side with respect to the ferrite core 52. The Y capacitor 62 includes two capacitors 63a, 63b corresponding to the pair of power lines. The capacitors 63a, 63b are grounded to a housing of the front PCU 12.

As represented by the equivalent circuit, a power line of the booster circuit (not shown) and the cooler for cooling the power card are connected via a parasitic capacitance 70. Further, a stable portion that is a portion between the booster circuit and the inverters 80, 82 and the cooler are connected via parasitic capacitances 72, 74. A variable portion that is a portion between the inverters 80, 82 and the MG 14 and the cooler are connected via parasitic capacitances 76, 78. The cooler is grounded to the housing of the front PCU 12.

With the Y capacitor 62 provided, common mode current flowing out of the inverters 80, 82 flows to the housing of the front PCU 12 via the Y capacitor 62, and returns to the inverters 80, 82 via the parasitic capacitances 70, 72, 74, 76, 78. That is, installation of the Y capacitor 62 provides a common mode noise feedback path for the inverters 80, 82 that are the noise generation sources. However, the Y capacitor 62 has an effect of lowering the impedance in a specific frequency range.

The ferrite core 52 that is an impedance element has a role of increasing the impedance lowered due to the installation of the Y capacitor 62. What is important here is that the ferrite core 52 installed for the front PCU 12 has the effect of increasing the impedance of other devices and the high-voltage battery 4 connected to the ferrite core 52 via the branch box 40. Similarly, the ferrite cores 50, 54, 56 installed for other devices such as the rear PCU 8 and the high-voltage battery 4 also have the effect of increasing the impedance of the front PCU 12.

The impedance on the power distribution circuit side with respect to a connection portion of the devices connected to the power distribution circuit or the high-voltage battery 4 with the power distribution circuit is defined as the system impedance. Examples of the target device of the system impedance include the rear PCU 8, the front PCU 12, the water heater 16, the air conditioner 18, the first DC-DC converter 42, and the second DC-DC converter 20. The system impedance value varies from device to device. For example, the system impedance value from the point of the front PCU 12 is different from the system impedance value from the point of the first DC-DC converter 42, and is also different from the system impedance value from the point of the high-voltage battery 4. When the system impedance can be increased in each of the devices connected to the power distribution circuit and the high-voltage battery 4, the noise can be reduced in the entire system of the vehicle power supply system 2.

However, it is difficult and impractical to reduce the noise in all the frequency ranges. Further, even when the noise is reduced with focusing on a specific frequency range, it is not easy to bring the noise close to zero. The noise that is preferentially reduced in the vehicle is the noise in the AM band, that is, the radio noise. Therefore, in the embodiment, the ferrite cores 50, 52, 54, 56 are designed such that at least the radio noise is reduced.

More specifically, the ferrite cores 50, 52, 54, 56 are designed such that the system impedance in each of the devices connected to the power distribution circuit and the high-voltage battery 4 becomes higher than a predetermined lower limit impedance at least in the AM band. As the lower limit impedance set with respect to the system impedance, for example, the impedance in the AM band determined based on impedance-frequency characteristics of a line impedance stabilization network (LISN) may be used.

Further, in the embodiment, the ferrite cores 50, 52, 54, 56 are designed such that, at least in the AM band, a variation in the system impedance between the devices connected to the power distribution circuit and the high-voltage battery 4 is settled within a predetermined allowable range. The range of the system impedance in which the variation is allowed is, for example, 20Ω. Reduction of the variation in the system impedance between the devices and the high-voltage battery 4 makes it possible to suppress entry of the noise to a specific device having a low system impedance.

Design of the ferrite cores 50, 52, 54, 56 indicates determination of shapes and materials. For example, when the ferrite cores 50, 52, 54, 56 have a ring shape, the outer diameter, inner diameter, and width of the ring are parameters that determine the impedance. Further, magnetic permeability-frequency characteristics are determined for the material used for each of the ferrite cores 50, 52, 54, 56. Therefore, adjustment of the shapes and materials makes it possible to adjust the impedance for each of the ferrite cores 50, 52, 54, 56.

3. Procedure for Adjusting Shapes and Materials of Ferrite Cores

Figure 3:
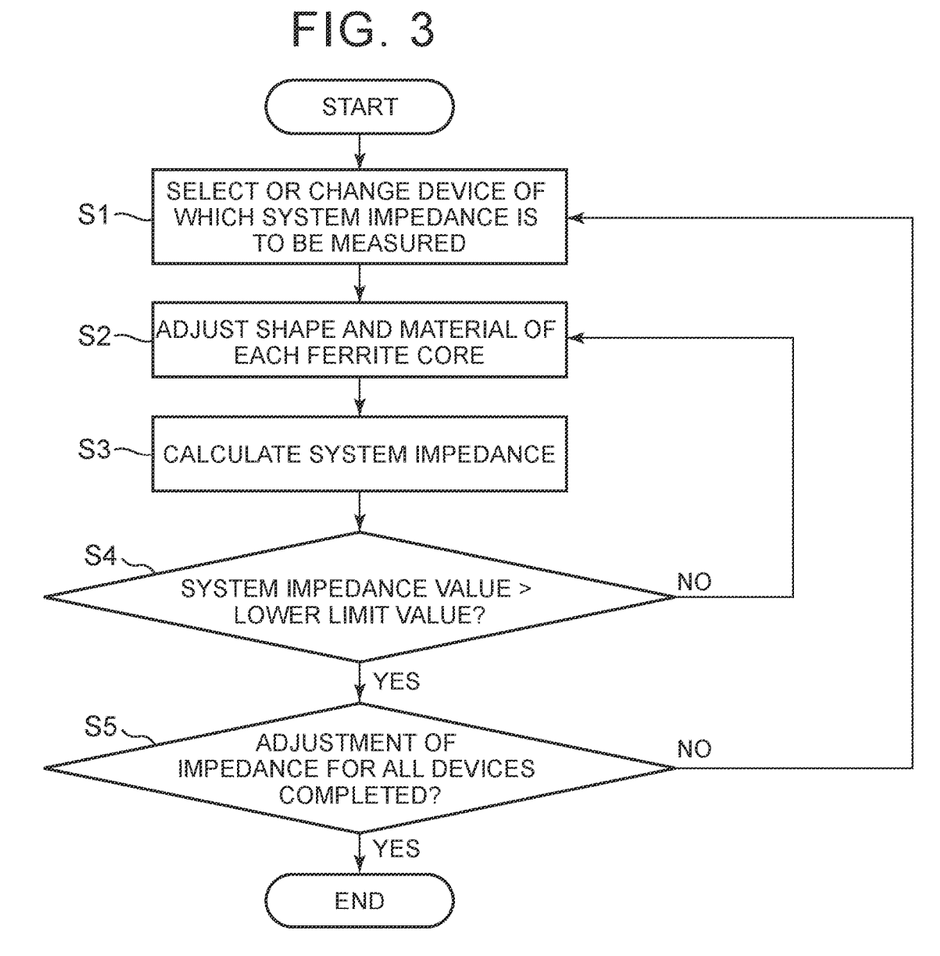
FIG. 3 is a diagram showing a procedure for adjusting a shape and a material of a ferrite core.

Next, the procedure for adjusting the shapes and materials of the ferrite cores 50, 52, 54, 56 will be described with reference to FIG. 3. First, in step S1, a device of which system impedance is to be measured is selected from the target devices (including the high-voltage battery 4). In step S2, the shapes and materials of the ferrite cores 50, 52, 54, 56 are adjusted. In step S3, the system impedance is calculated based on the adjusted characteristic values of the ferrite cores 50, 52, 54, 56. In step S4, whether the calculated system impedance is larger than a lower limit value that is determined based on the LISN is determined. When the system impedance is equal to or less than the lower limit value, the processing returns to step S2 and the shape and the material are readjusted.

The processing from steps S2 to S4 will be described more specifically as follows. First, the ferrite material is determined for one of the ferrite cores. Examples of selectable ferrite materials include HF40, HF57, and HF70. Determination of the ferrite material further determines the magnetic permeability based on the magnetic permeability-frequency characteristics unique to the ferrite material. Next, the core shape of the ferrite core is tentatively determined. Once the core shape and the magnetic permeability are determined, the impedance, the inductance, and the reactance that are the characteristic values of the ferrite core are quantified. The same processing is executed for other ferrite cores. The system impedance is then calculated based on the impedance, the inductance, and the reactance of each of the ferrite cores. When the calculated value of the system impedance is equal to or less than the lower limit value, the core shape is tentatively determined again without changing the ferrite material. When the calculated value of the system impedance becomes larger than the lower limit value as a result of optimization by fine-tuning the core shape as described above, the core shape tentatively determined at that time is determined as a formal core shape. On the other hand, when the calculated value of the system impedance does not exceed the lower limit value, the ferrite material is changed and the above processing is repeated.

When the system impedance becomes larger than the lower limit value, the processing proceeds to step S5. In step S5, whether adjustment of the system impedance is completed for all the target devices (including the high-voltage battery 4) is determined. When adjustment for all the target devices is not completed, the processing returns to step S1, and the devices of which system impedance is calculated are changed. The above processing is repeated until adjustment of the system impedance is completed for all the target devices.

In the above procedure, the shapes and the materials of the ferrite cores 50, 52, 54, 56 are adjusted by means of simulation. However, in step S2, the shapes and the materials of the ferrite cores 50, 52, 54, 56 may actually be adjusted. Further, in step S3, the ferrite cores 50, 52, 54, 56 having the shapes and the materials being actually adjusted may be mounted on the vehicle power supply system 2, and the system impedance may be measured using an impedance analyzer.

4. Results of Adjusting Shapes and Materials of Ferrite Cores

Figure 4:
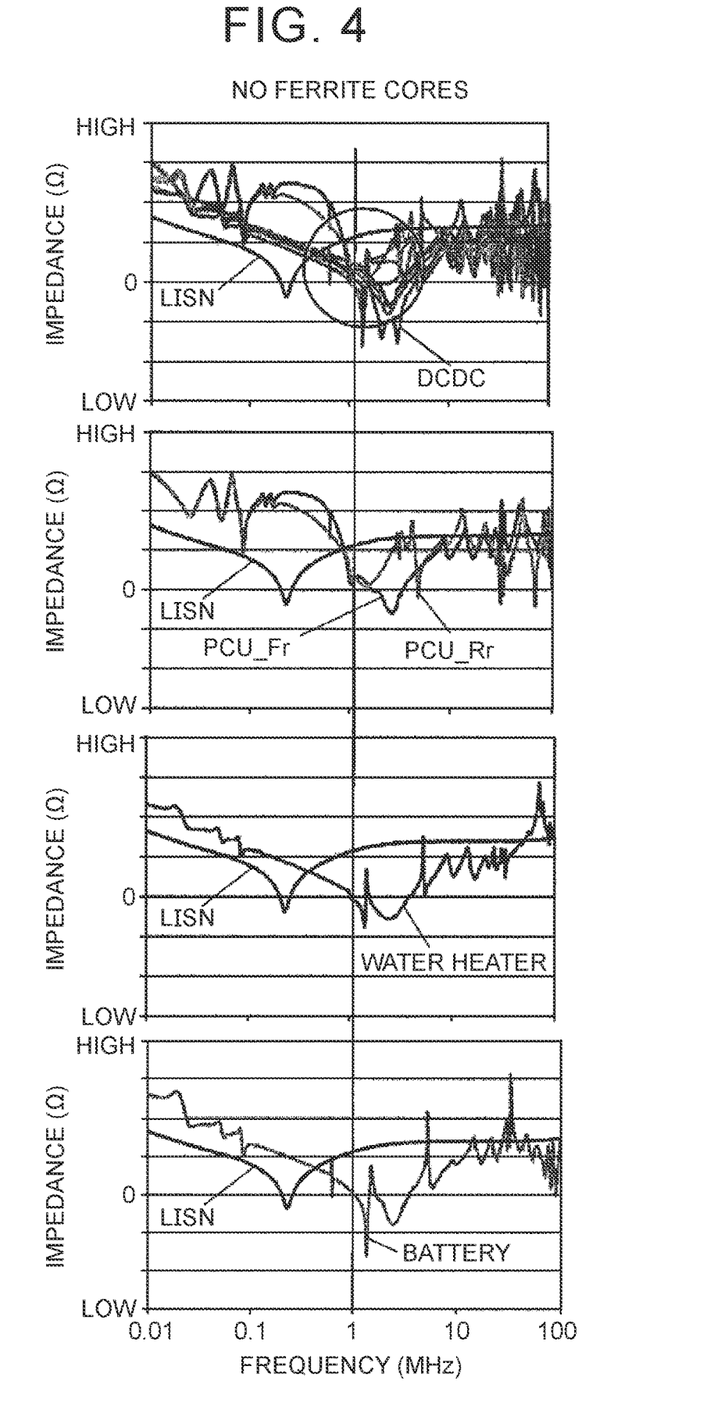
FIG. 4 is a diagram showing frequency characteristics of a system impedance when no ferrite cores are provided.
Figure 5:
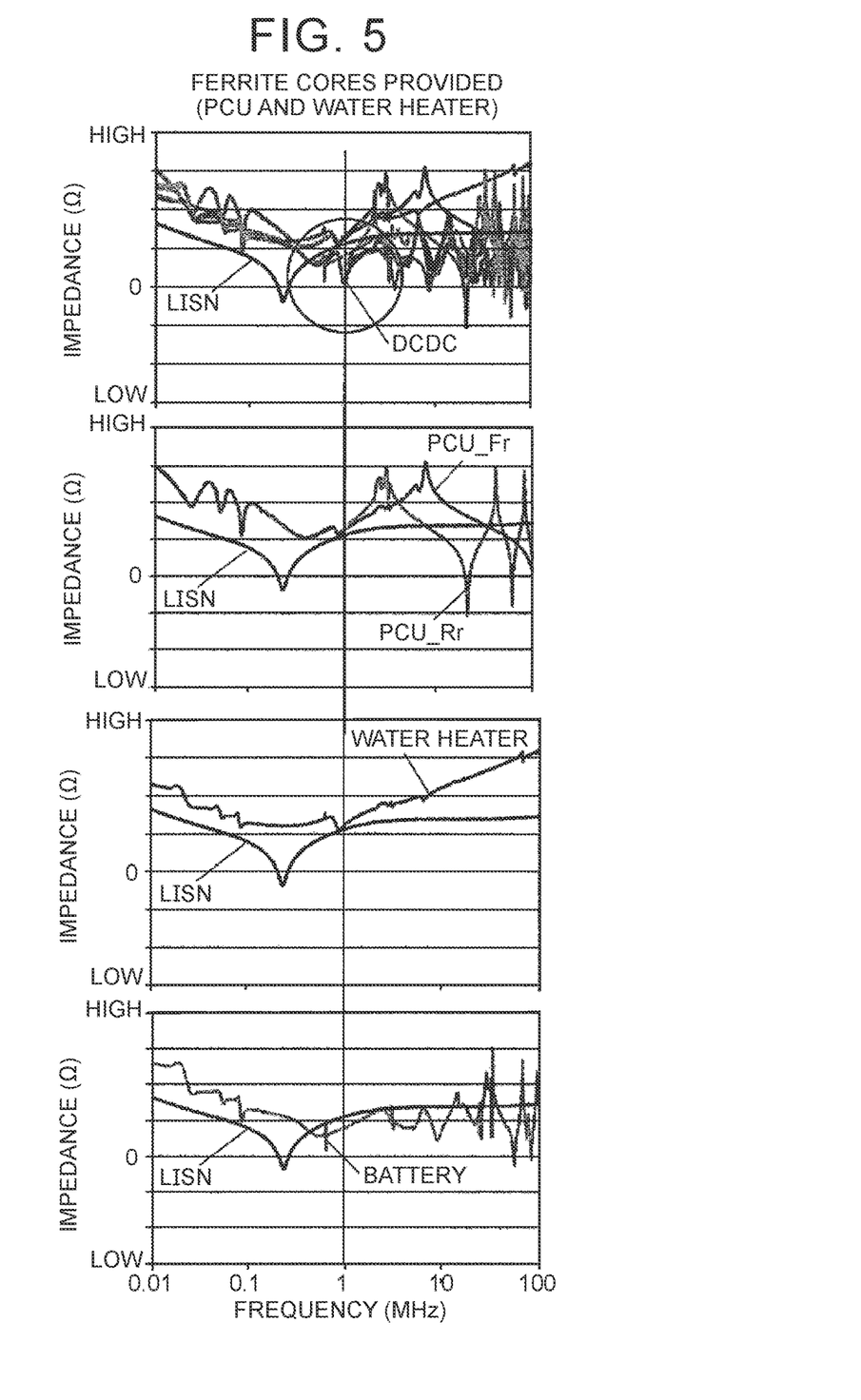
FIG. 5 is a diagram showing frequency characteristics of a system impedance when the ferrite cores are provided for the PCU and a water heater.
Figure 6:
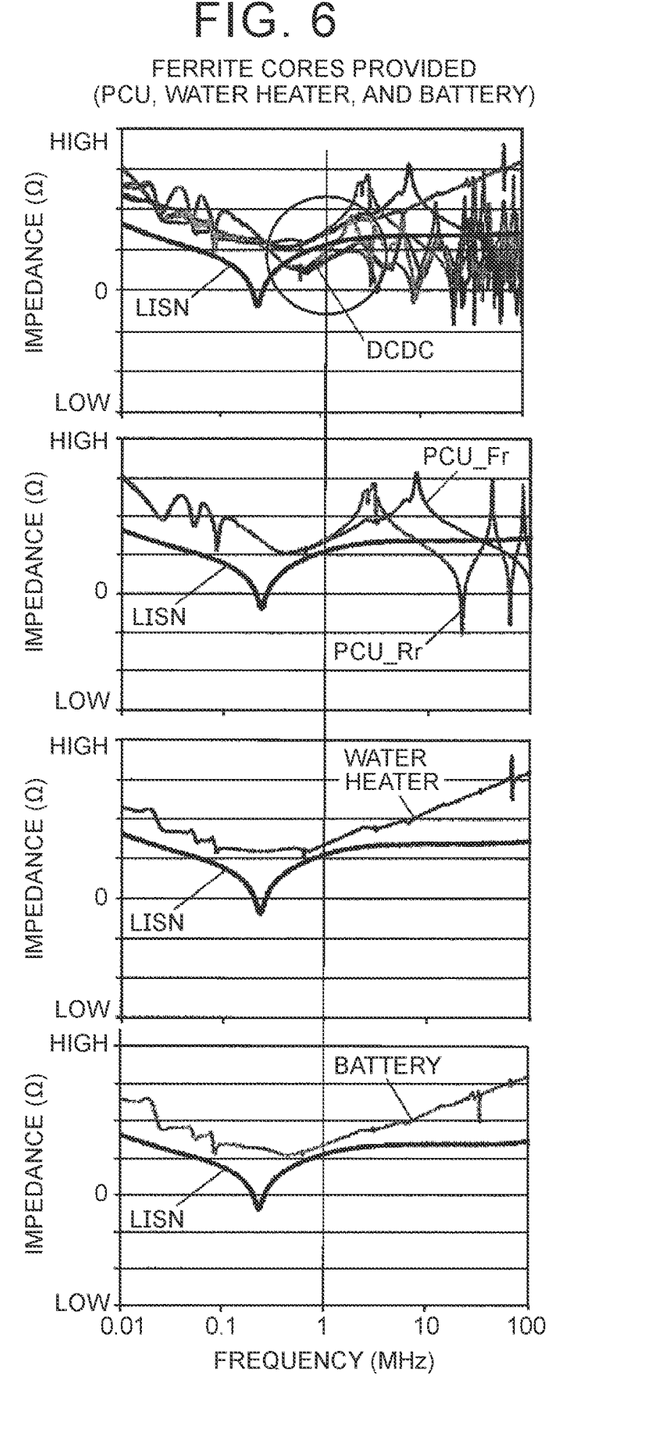
FIG. 6 is a diagram showing frequency characteristics of a system impedance when the ferrite cores are provided for the PCU, the water heater, and a battery.

Finally, the results of adjusting the shapes and the materials of the ferrite cores 50, 52, 54, 56 in the above procedure will be described with reference to FIGS. 4 to 8. FIGS. 4 to 6 each include four graphs. The graph at the top shows the frequency characteristics of the system impedance from the point of each of the target devices (including the high-voltage battery 4) along with the frequency characteristics of the LISN. The second graph shows the frequency characteristics of the system impedance from the point of each of the rear PCU 8 and the front PCU 12 along with the frequency characteristics of the LISN. The third graph shows the frequency characteristics of the system impedance from the point of the water heater 16 along with the frequency characteristics of the LISN. The graph at the bottom shows the frequency characteristics of the system impedance from the point of the high-voltage battery 4 along with the frequency characteristics of the LISN.

FIG. 4 shows the frequency characteristics of the system impedance when the vehicle power supply system 2 does not include the ferrite cores. Focusing on the vicinity of 1 MHz that is the center of the AM band, the system impedance is lower than the impedance of the LISN in each of the rear PCU 8, the front PCU 12, the water heater 16, and the high-voltage battery 4. Further, the system impedance from the point of the first DC-DC converter 42 (denoted as DCDC in the graph) is also lower than the impedance of the LISN.

FIG. 5 shows the frequency characteristics of the system impedance when the ferrite cores 50, 52, 54 are provided for the rear PCU 8, the front PCU 12, and the water heater 16. The system impedance of each of the rear PCU 8, the front PCU 12, and the water heater 16 in the AM band is higher than the impedance of the LISN. However, the system impedance from the point of the high-voltage battery 4 remains slightly lower than the impedance of the LISN, and the system impedance from the point of the first DC-DC converter 42 also remains lower than the impedance of the LISN.

FIG. 6 further shows the frequency characteristics of the system impedance when the ferrite core 56 is also provided for the high-voltage battery 4. The system impedance of the high-voltage battery 4 in the vicinity of 1 MHz in the AM band is higher than the impedance of the LISN. Further, the system impedance of other devices including the first DC-DC converter 42 in the AM band increases to near the impedance of the LISN. Further, the variation of the system impedance in the AM band among the target devices (including the high-voltage battery 4) is settled within the range of about 20Ω.

In the graph shown in FIG. 6, the system impedance of some devices including the first DC-DC converter 42 in the AM band is not higher than the impedance of the LISN. However, adjustment of the shape and the material of each of the ferrite cores 50, 52, 54, 56 makes it possible to increase the system impedance in the AM band of all of the target devices to be higher than the impedance of the LISN, while the variation of the system impedance among the target devices is settled within an allowable range.

Figure 7:
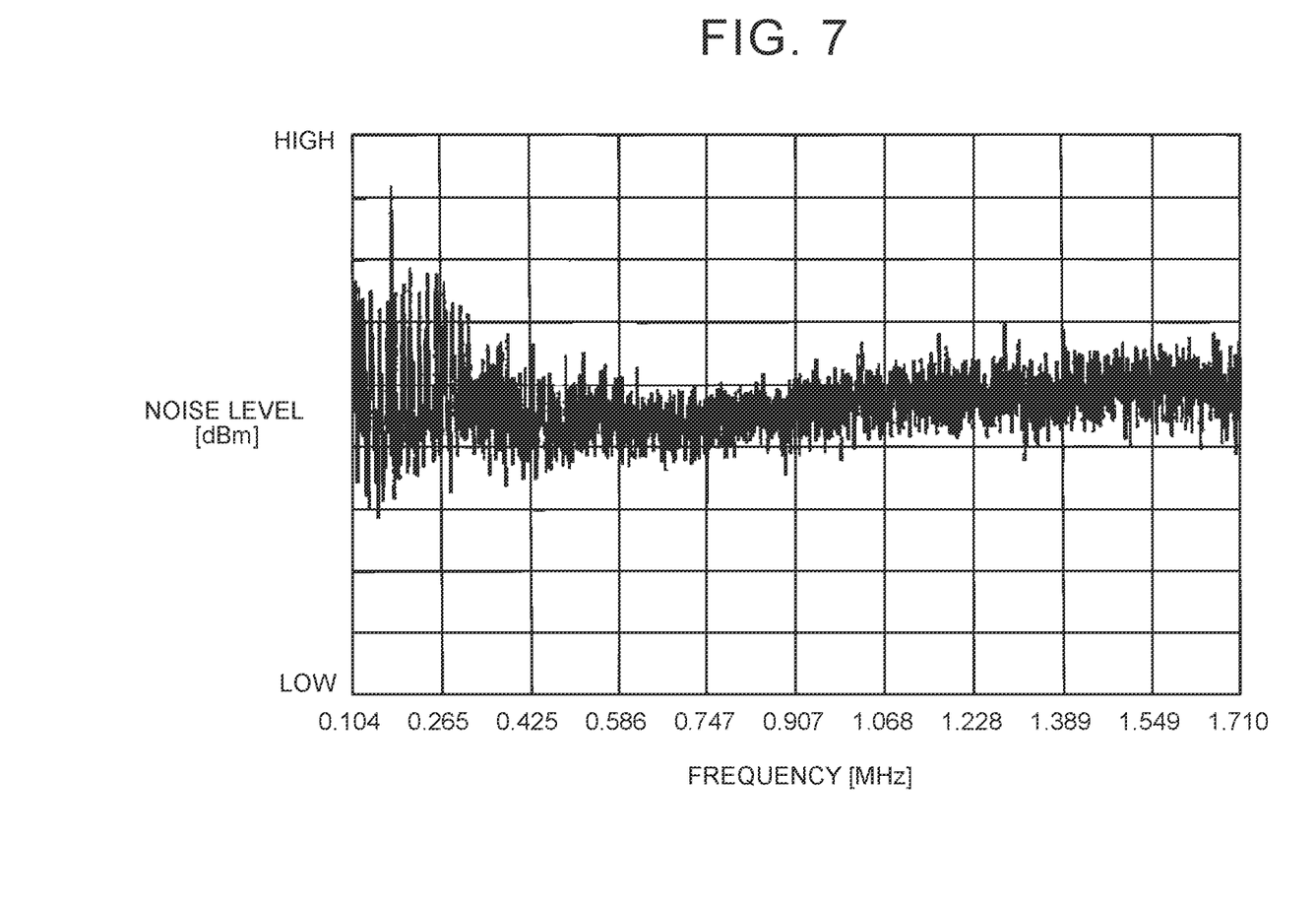
FIG. 7 shows noise level-frequency characteristics before adjusting the shapes and the materials of the ferrite cores.
Figure 8:
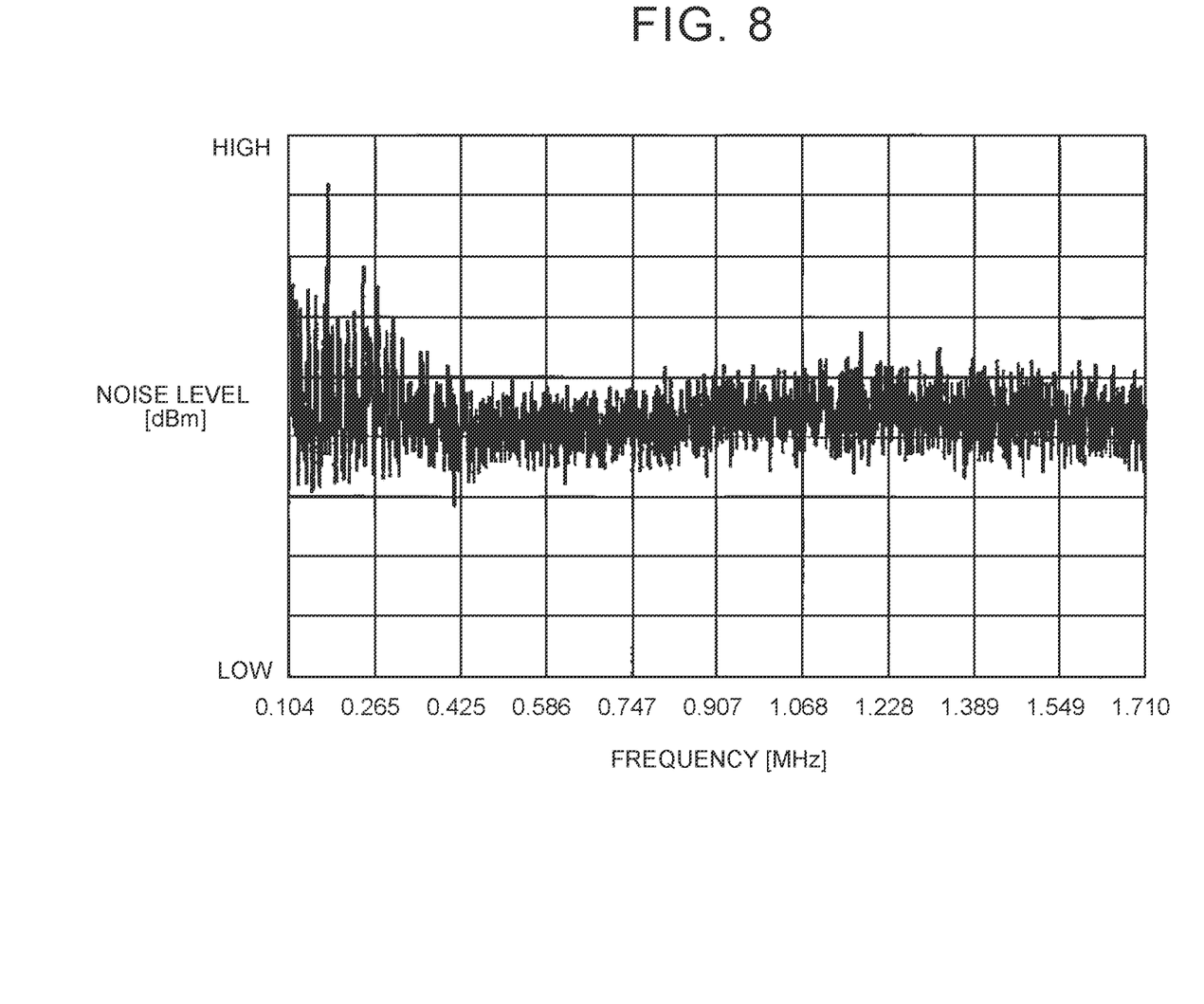
FIG. 8 shows noise level-frequency characteristics after the shapes and the materials of the ferrite cores are adjusted.

FIG. 7 shows noise level-frequency characteristics before adjusting the shapes and the materials of the ferrite cores 50, 52, 54, 56. FIG. 8 shows the noise level-frequency characteristics after the shapes and the materials of the ferrite cores 50, 52, 54, 56 are adjusted. Reduction of the noise level in the AM band as a whole can be confirmed from a comparison of the two noise level-frequency characteristics as a result of adjusting the shapes and the materials of the ferrite cores 50, 52, 54, 56.

In the embodiment, the rear PCU 8, the front PCU 12, and the water heater 16 are regarded as the noise generators. However, any device having a switching element can be a noise generator. Therefore, the first DC-DC converter 42 and the second DC-DC converter 20 can also be the noise generators. However, what is important is to reduce the noise in the AM band as the entire vehicle power supply system 2, and the ferrite cores are not necessarily provided for all the noise generators. In the examples shown in FIGS. 4 to 8, the noise in the AM band is reduced in the entire system even when the ferrite cores are not provided for the first DC-DC converter 42 and the second DC-DC converter 20.

What is claimed is:

1. A vehicle power supply system comprising:
   a power storage device;
   a plurality of devices including a plurality of noise generators; and
   a power distribution circuit that connects the power storage device and the devices, wherein
   each of the noise generators is connected to the power distribution circuit via a noise filter;
   the noise filter includes a first impedance element and a Y capacitor that is provided closer to the noise generators than the first impedance element; and
   the first impedance element provided for each of the noise generators is an impedance element with a shape and a material that increase a first system impedance of each of the devices to be higher than a predetermined lower limit impedance at least in an amplitude modulation band, and the first system impedance is an impedance on a power distribution circuit side with respect to a connection portion of each of the devices with the power distribution circuit.

2. The vehicle power supply system according to claim 1, wherein:
   the power storage device is connected to the power distribution circuit via a second impedance element; and
   the second impedance element provided for the power storage device is an impedance element with a shape and a material that increase a second system impedance to be higher than the predetermined lower limit impedance at least in the amplitude modulation band in the power storage device, and the second system impedance is an impedance on a power distribution circuit side with respect to a connection portion of the power storage device with the power distribution circuit.

3. The vehicle power supply system according to claim 2, wherein the first impedance element and the second impedance element are impedance elements with shapes and materials that settle a variation of the first system impedance and the second system impedance among the devices and the power storage device within a predetermined allowable range.

4. The vehicle power supply system according to claim 1, wherein the first impedance element is an impedance element with a shape and a material that settle a variation of the first system impedance among the devices within a predetermined allowable range.

5. The vehicle power supply system according to claim 1, wherein the predetermined lower limit impedance is an impedance determined based on impedance-frequency characteristics of a line impedance stabilization network.

6. The vehicle power supply system according to claim 1, wherein the first impedance element and a second impedance element are ferrite cores.

7. The vehicle power supply system according to claim 1, wherein at least one of the noise generators is an inverter including a switching element.

8. The vehicle power supply system according to claim 1, wherein at least one of the devices is a direct current-direct current converter.

* * * * *